United States Patent [19]

Goldberger et al.

[11] Patent Number: 4,516,291
[45] Date of Patent: May 14, 1985

[54] APPARATUS AND PROCESS FOR FORMING MEAT PATTIES

[75] Inventors: Robert D. Goldberger, Wayzata; James F. Stower, South St. Paul, both of Minn.

[73] Assignee: Goldberger Foods Inc., Minneapolis, Minn.

[21] Appl. No.: 499,227

[22] Filed: May 31, 1983

[51] Int. Cl.³ .............................................. A22C 7/00
[52] U.S. Cl. .......................................... 17/32; 426/513
[58] Field of Search ............................. 17/32; 426/513

[56] References Cited

U.S. PATENT DOCUMENTS

| | | | |
|---|---|---|---|
| 2,580,008 | 12/1951 | Elsaesser | 17/32 |
| 2,584,536 | 2/1952 | Belt | 17/32 |
| 3,060,494 | 10/1962 | Noble | 17/32 |
| 3,488,798 | 1/1970 | Barnes, Jr. | 17/32 |
| 3,550,190 | 2/1969 | Richards et al. | 17/32 |
| 3,823,441 | 7/1974 | Bridge, Jr. | 17/26 |
| 3,940,217 | 2/1976 | McCarthy et al. | 425/98 |
| 3,999,248 | 12/1976 | Mauer | 17/32 |
| 4,054,967 | 10/1977 | Sandberg et al. | 17/32 |
| 4,106,162 | 8/1978 | Fournier | 17/32 |
| 4,137,604 | 2/1979 | Sandberg et al. | 17/32 |
| 4,182,003 | 1/1980 | Lamartino et al. | 17/32 |
| 4,418,446 | 12/1983 | Sandberg et al. | 17/32 |

*Primary Examiner*—Willie G. Abercrombie
*Attorney, Agent, or Firm*—James V. Harmon

[57] ABSTRACT

An apparatus for forming meat patties is described comprising a meat pump for forcing ground meat into a mold chamber having substantially parallel top and bottom walls and a side wall with an irregular outline. Provision is made for ejecting the formed patties from the mold and for pressing top and bottom surfaces corresponding to the top and bottom of the mold toward one another to expand the patty radially in all directions and to form compression fractures around its periphery. The resulting patties have an irregular shape and each is shaped somewhat differently while the weight of each patty is held within precisely predetermined limits, usually within ±2%.

25 Claims, 20 Drawing Figures

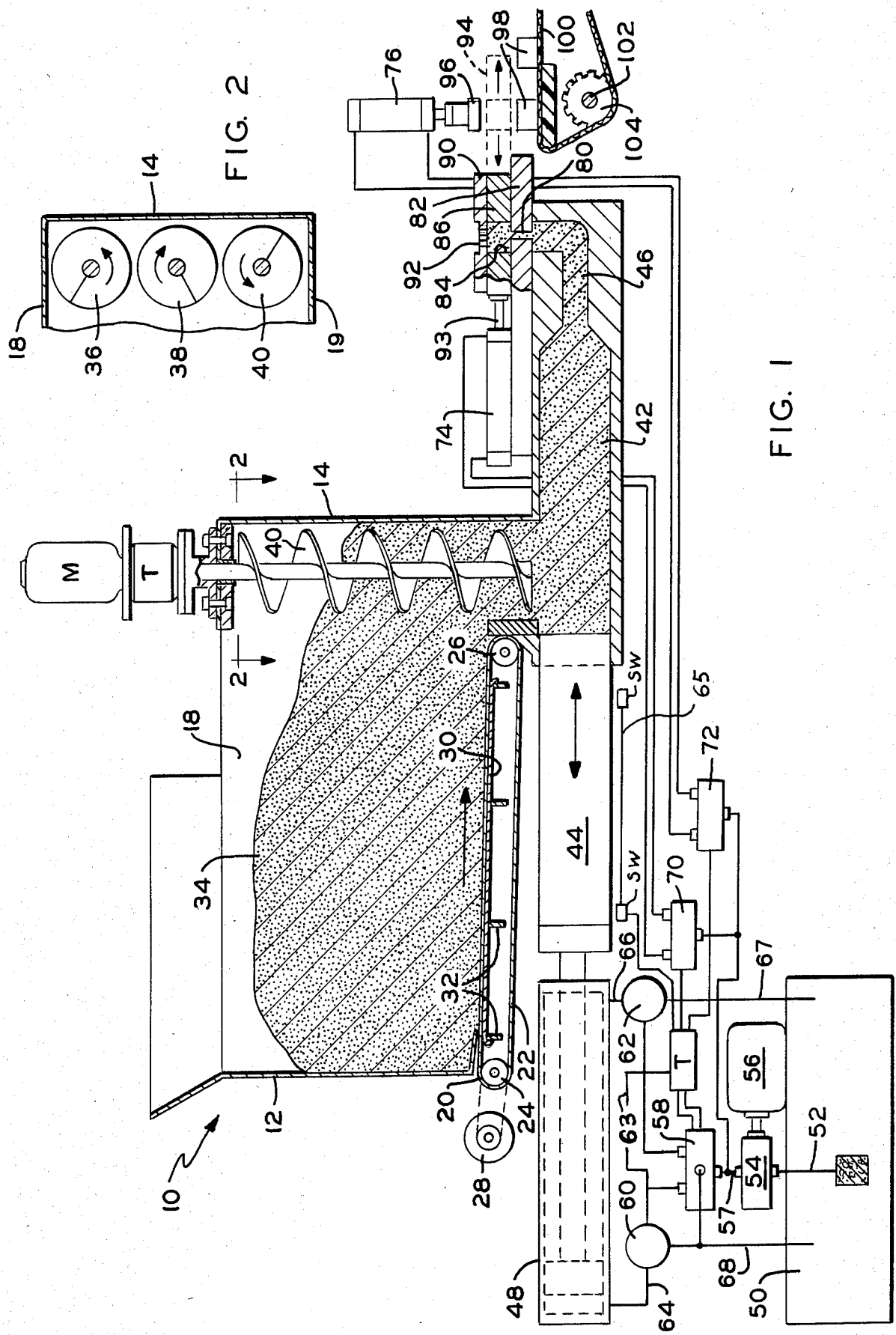

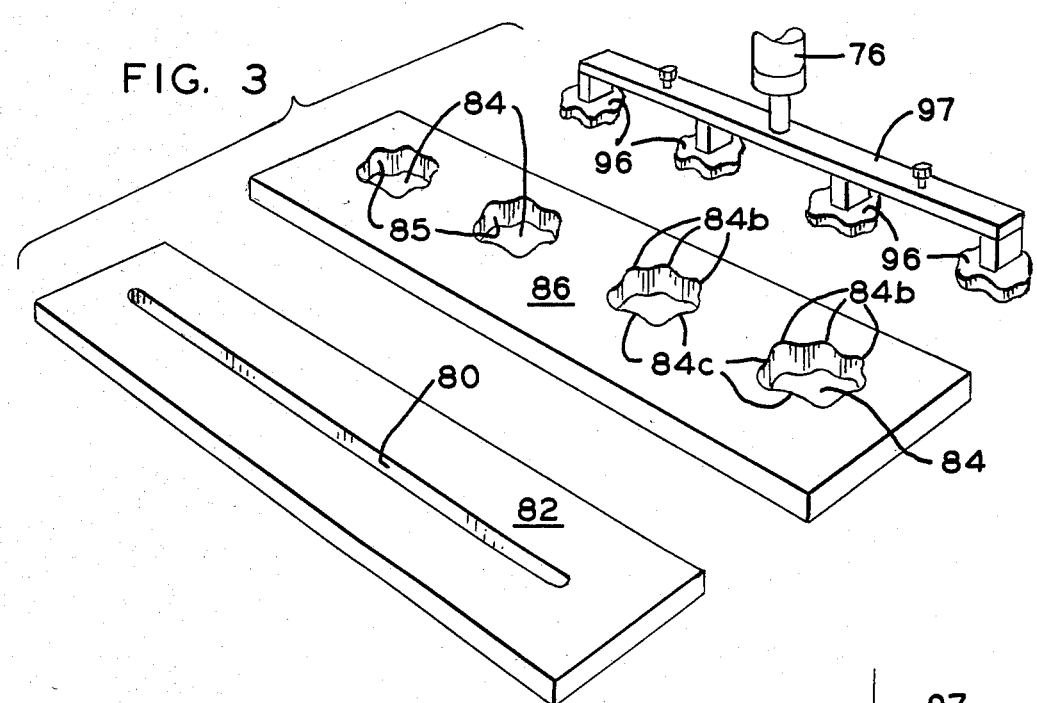
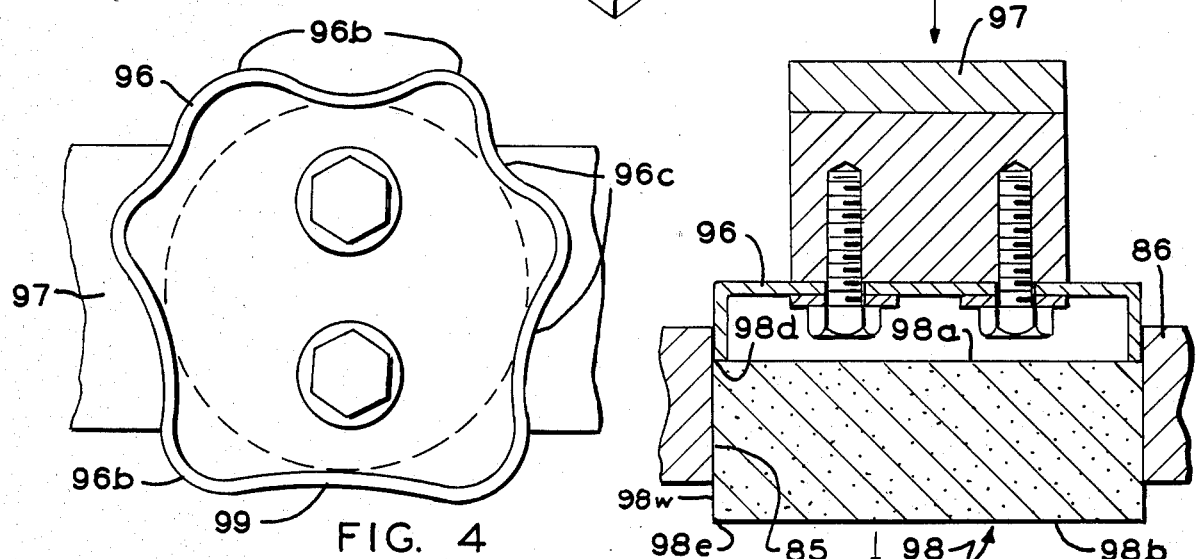
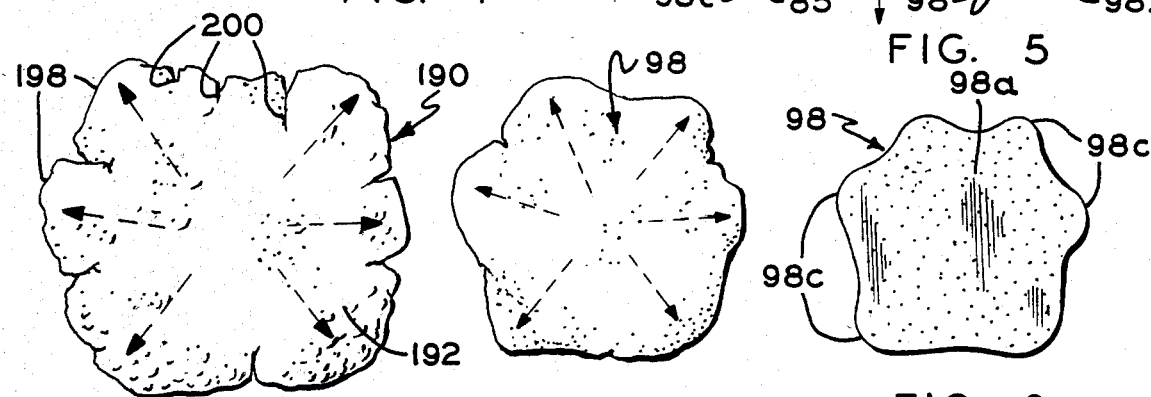

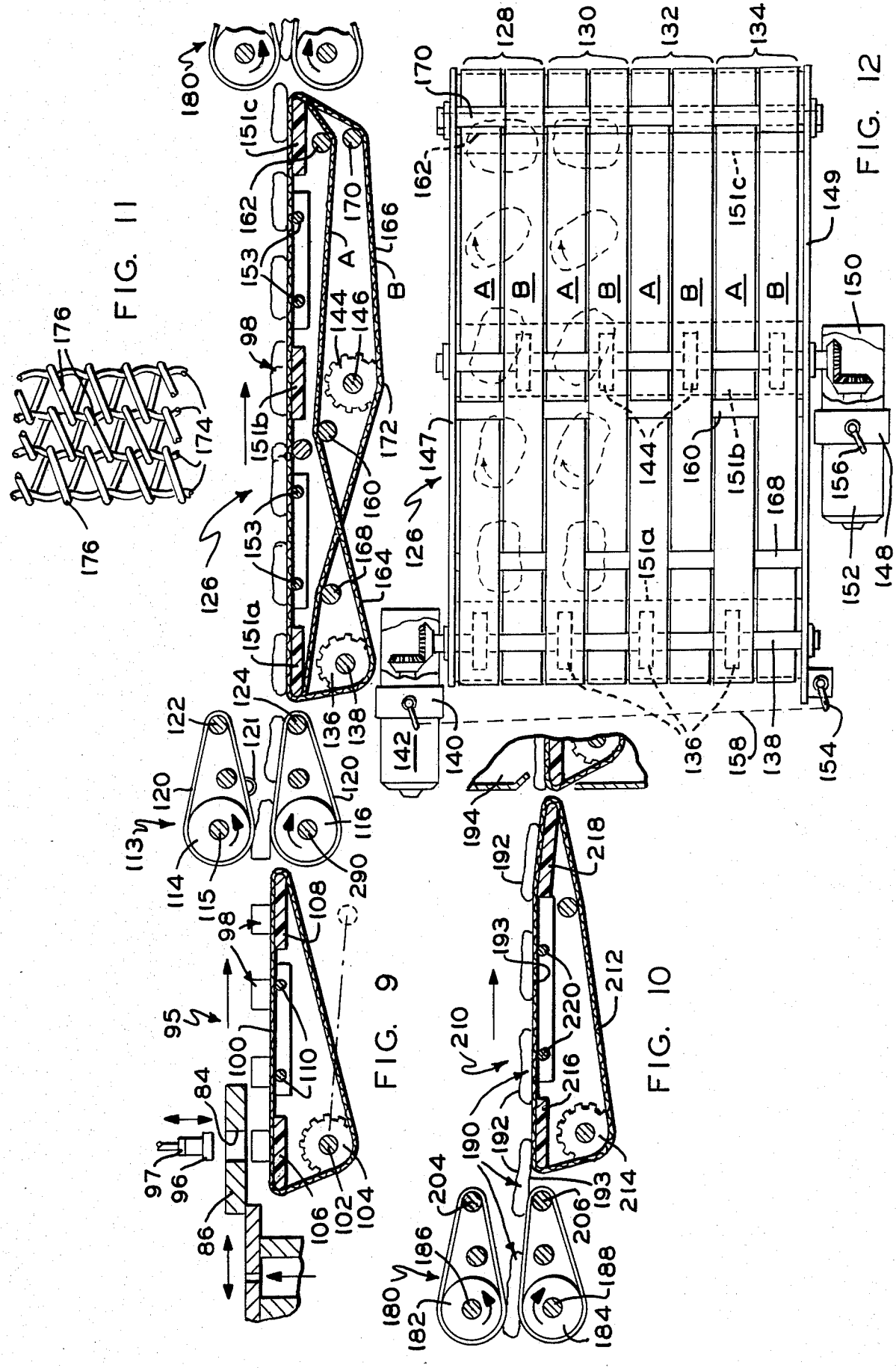

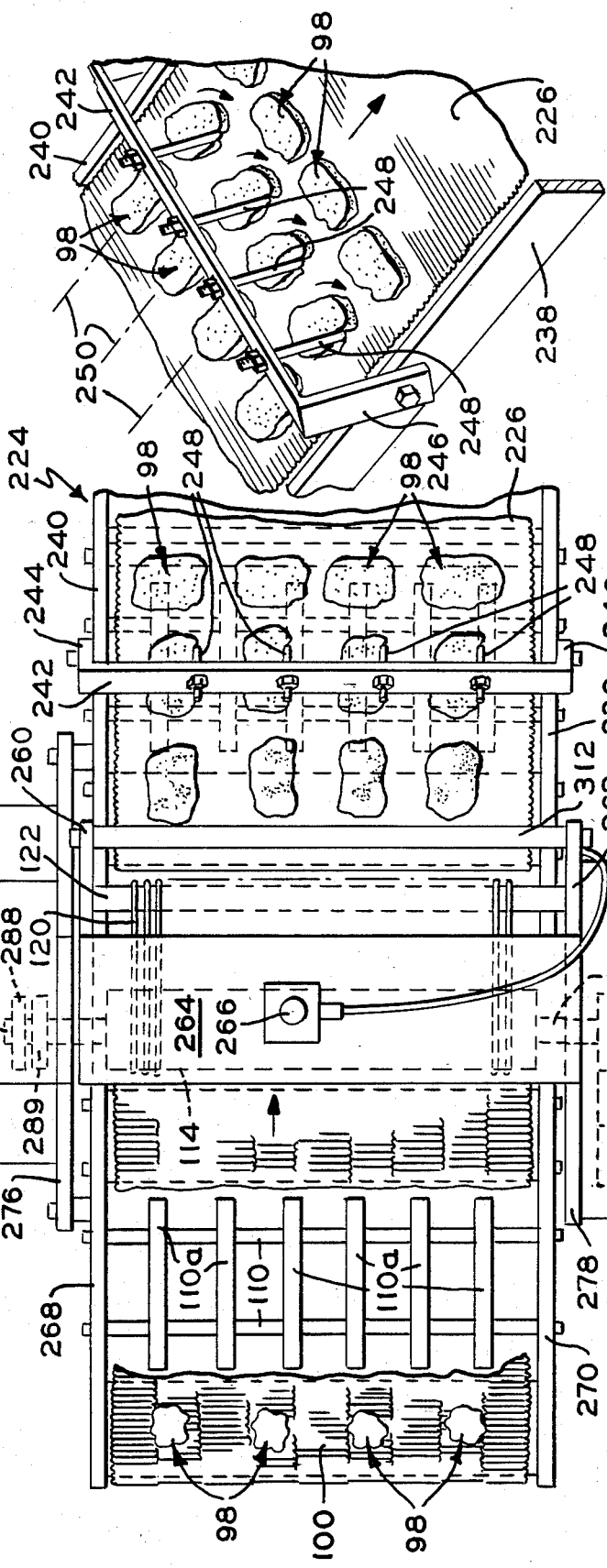

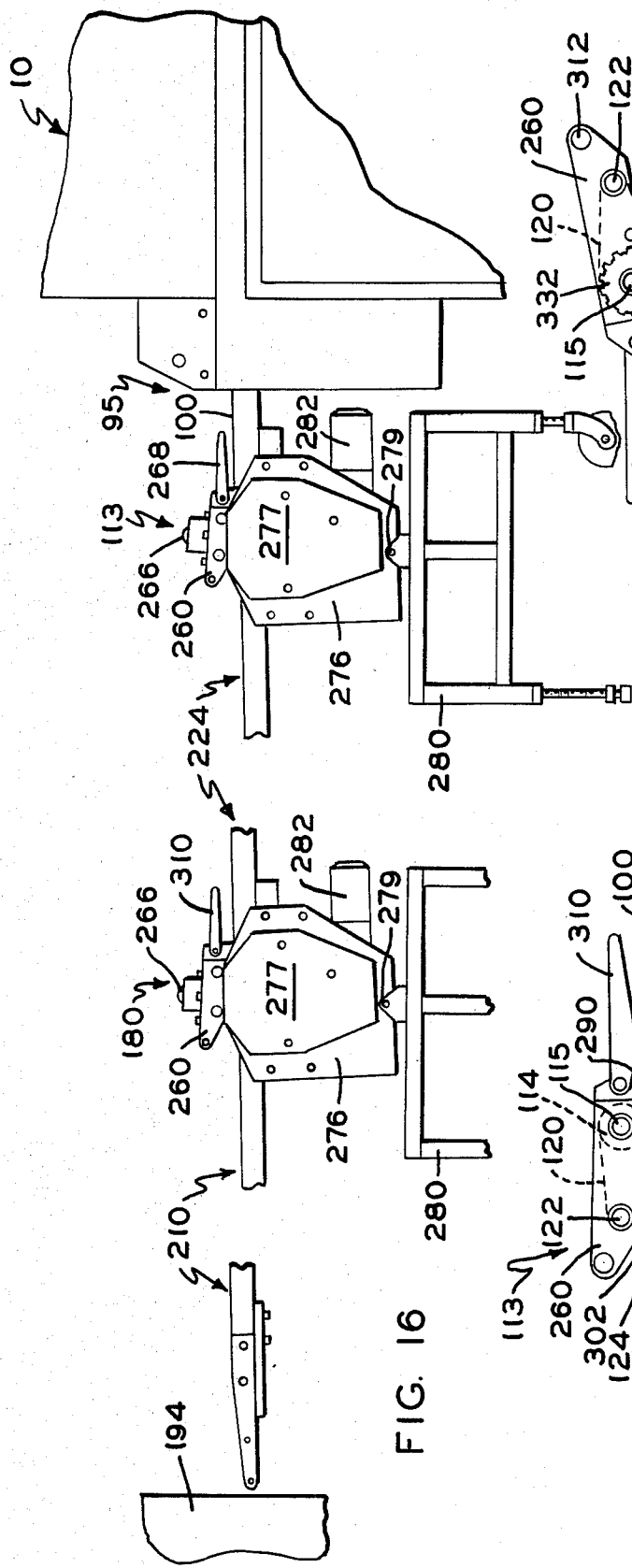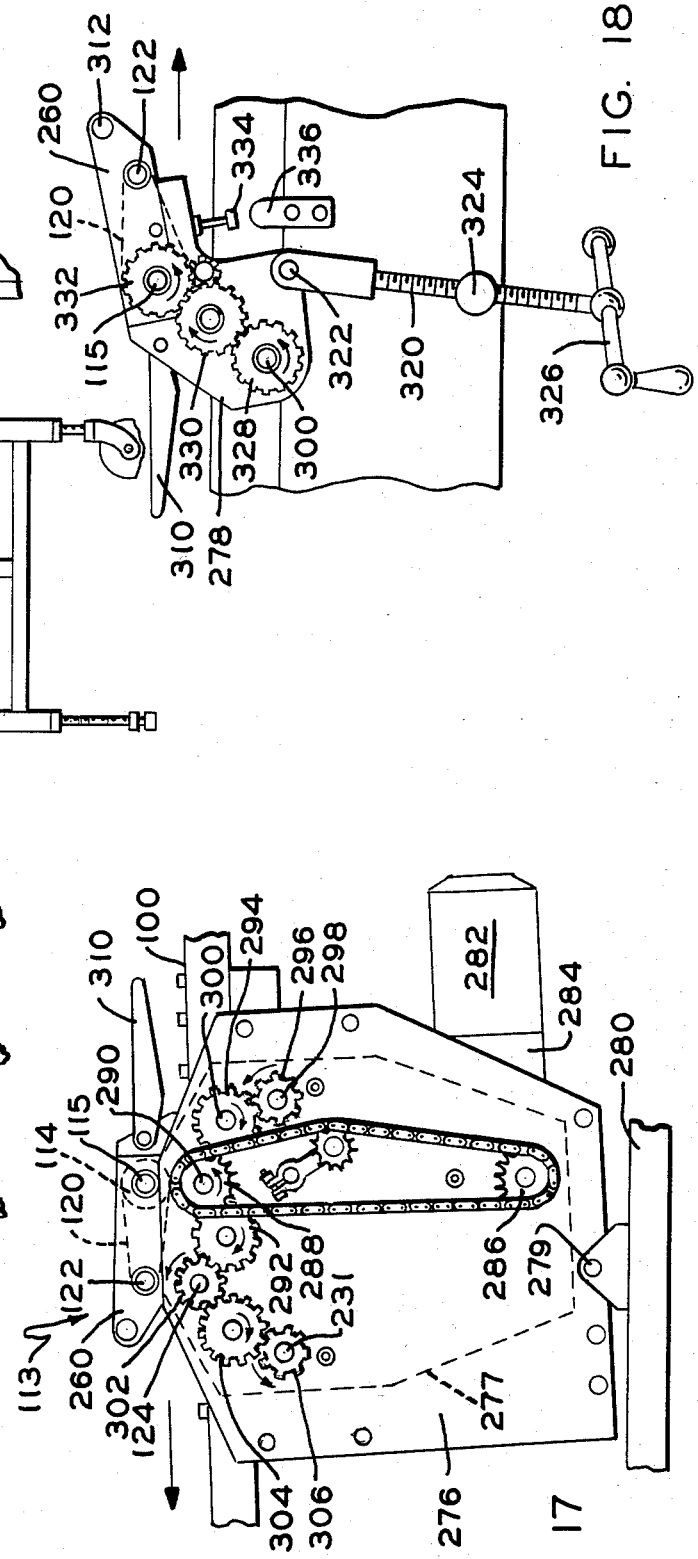

APPARATUS AND PROCESS FOR FORMING MEAT PATTIES

FIELD OF THE INVENTION

The present invention relates to food machinery and to a new process for forming meat patties.

BACKGROUND OF THE INVENTION

In the automated production of frozen meat products, it has become the industry practice to manufacture the patties using high speed machinery in a centrally located production plant and to ship the patties in a frozen condition to the point of use; a restaurant or cafeteria or other food outlet such as a fast food restaurant. With the rapid growth of this industry, the use of meat patty forming machines has proliferated to the point where it has become almost essential to the successful operation of a high speed frozen meat plant in which frozen patties are produced. Some of the most modern of these machines operate at production speeds of 4,000 pounds or more per hour on a single line. After the patties are formed, they are conveyed directly into a freezing tunnel and frozen, for example, by surrounding them with liquid nitrogen. The frozen patties are then placed in cartons or boxes and are stored in the frozen condition for shipment to the restaurant. Typical equipment of this kind is illustrated by U.S. Pat. Nos. 4,182,003, 4,054,967 and 4,137,604.

While this equipment has been highly successful in producing meat patties at high speed, the results have not been entirely satisfactory particularly in better restaurants where high quality and slight nuances of flavor or texture become important. In these better quality restaurants, the conventional pressure formed patties are not perceived to have anything of value beyond those found in a fast food restaurant. Thus, equipment of the type described and illustrated in the patents produces patties having a flat, circular or square shape with almost perfectly smooth upper and lower surfaces. Many consumers believe these flat discs of meat are monotonous and uninteresting and therefore are not especially appetizing. In addition, partly because they are relatively thin, usually about ¼" thick, but more importantly because they are circular or square in shape, all portions of the patty cook to about the same consistency. The result is that there are few variations in the eating taste and texture from one part of the finished patty to the other and the fat and moisture exuded during the cooking process which most people perceive as adding to the flavor of the finished meat can easily run off and be lost. Thus, the square or circular shaped meat patties with smooth upper and lower surfaces formed by the internal metal die surfaces of the machine are thought by many people to be rather insipid both in their eye appeal and in their taste and bite. Moreover, all the patties have exactly the same shape. Another problem with the die formed patties of the type described above is that they tend to have a relatively rubbery, almost resilient texture that many people find undesirable. Moreover, patties of this kind tend to become thinner as they cook and some of them shrink down to such an extent that the consumer is likely to wonder how a hamburger could be made so thin.

Attempts have been made for example as described in U.S. Pat. No. 3,060,494 for molding food into the form of a steak by forming the meat in a metal collar or ring similar to a cookie cutter with a separate shaped ring for the bone. This is, however, slow and each finished piece of meat produced has the same shape as all the others. By contrast with the present invention, it is an objective to find a way to give each piece a different and unique shape while operating at production speeds of around 2 tons an hour or more. Other equipment has been previously proposed as described in U.S. Pat. No. 3,550,190 for folding steaks along a center line but such steaks, depending upon their composition, can fall apart or delaminate at the contact line between the two layers. Moreover, the process forms a rather long piece of meat with pointed ends similar to a pastry turnover. This shape is unsatisfactory for many meat products particularly meat patties such as hamburger patties toward which the present invention is directed.

Achieving precise weight control of each patty is extremely important. In handmade patties there is, of course, no control. With machine made patties, control is possible provided subsequent operations do not change the piece weight, e.g., due to meat fragments falling off. Thus, a 2% difference after a day of running at 4 tons per hour can make a difference of 1,280 lbs. of meat lost assuming the error is cumulative as an excess.

In overcoming the foregoing and related deficiencies of the prior art, this invention then comprises the features hereinafter fully described and particularly pointed out in the claims, the following description setting forth in detail certain illustrative embodiments of the invention, these being indicative, however, of but a few of the various ways in which the principles of the invention may be employed.

SUMMARY OF THE INVENTION

The present invention provides a machine for forming meat patties that have a precisely and accurately controlled weight but have a natural irregular shape. The patties are generally circular or elongated as seen from above and have an irregular outline. They have extended substantially parallel top and bottom surfaces which are also somewhat irregular or uneven.

The apparatus comprises a molding plate provided with cavities for molding preforms from which the finished patties are made. A mold closure member is provided to seal off the mold cavity at certain times so that meat can be injected into the mold cavity and later expelled after removing the closure member. The apparatus has one or more injection ducts which extend into the mold cavity in the molding plate. A hopper or supply chamber for ground meat is provided and this supply chamber communicates with the mold cavity in the mold plate through the injection duct. A pump housing is provided. The pump housing includes a meat pumping means for forcing ground meat from the supply chamber through the duct into the molding chamber at a predetermined pressure compressing the meat within the die to a predetermined state of compression and density which results from the application of the predetermined applied pressure by the pump. A means is provided for establishing relative motion between the mold plate and the mold closure member to open the mold cavity in the mold plate. A patty knockout means is provided for movement into the mold cavity when the mold cavity is open to strip the patty preform from the mold.

The patty preform thus prepared has substantially parallel extended top and bottom surfaces corresponding to the top and bottom walls of the mold cavity within which it was formed. After being stripped from the mold cavity, the patty is flattened to reduce its thickness. Pressure members are provided for engagement with the top and bottom surfaces of the patty for the purpose of forcing the top and bottom surfaces toward one another as well as causing the edges of the patty to spread radially. The pressure also produces fractures in the edge portion of the patty. These radially oriented pressure induced fractures are distributed peripherally and extend from the edge part way toward the center of the patty.

The process employed for preparing the patties will now be briefly described. First, a supply of ground meat such as hamburger is provided. The ground meat is placed in the supply chamber and the mold cavities in the mold plate are closed by sealing the closure member against the mold plate. The pump is then operated forcing the ground meat from the supply chamber through the duct into the mold cavity until a predetermined pressure is reached. The applied pressure forces the meat into the mold cavity and determines its density and thus the weight of each of the preformed pieces thus prepared. The cavity is then opened and the preform is removed from the mold. Next, the top and bottom surfaces of the patty are pressed toward one another to flatten the patty thereby reducing its thickness and causing the edges to spread radially in all directions. At the same time, compression fractures are formed in the edge of the patty. The pressing of the patty is preferably done by passing the patty between a pair of parallel cooperating spaced apart rollers that are set apart at a distance which is less than the thickness of the preform. In this way, the preform is flattened to the desired thickness and each patty takes on an irregular and unique shape. Thus, each patty has a different appearance. In a preferred form of the invention, the patties are passed sequentially through two sets of such rollers to reduce the thickness in two successive stages. While conditions can be varied to suit circumstances and the end application for which the patties are to be used, the preferred particle grind size is about 3/32" to about 5/32". Pressure is applied in the mold cavity so that the product therein achieves a pressure preferably between about 70 and 80 psi. It is also very helpful for the product temperature to be between about 32° F. and 34° F. at the time it is molded. At lower temperatures it tends to be too stiff and at temperatures substantially in excess of 34° F., the ground meat can become so fluid that it has a tendency to stick to machine parts and does not achieve the desired final shape. The finished patty is free from smooth molded surfaces produced by shaping or forming it with molding dies or the like. This adds to its visual appeal making it more appetizing and more natural looking.

The present invention is particularly well suited for the production of beef patties or hamburgers, and it can also be used for the production of other kinds of meat patties. The term "meat" herein is used in a broad sense. It also refers to synthesized meat or what is commonly referred to as texturized vegetable protein and mixtures thereof with meat.

THE FIGURES

FIG. 1 is a semi-diagramatic partial side elevational view of one form of apparatus that can be used in accordance with the invention for forming preforms.

FIG. 2 is a horizontal cross-sectional view taken on line 2—2 of FIG. 1.

FIG. 3 is a perspective view showing the molding plate, the lower guide plate and stripper cups.

FIG. 4 is a bottom view of one of the stripper cups.

FIG. 5 is a partial vertical sectional view showing one of the stripper cups removing a preform from one of the mold cavities.

FIG. 6 is a plan view of one of the preforms as it appears when it emerges from the mold cavity.

FIG. 7 is a plan view of one of the patties after the first pressing step.

FIG. 8 is a top view of one of the finished patties after having been pressed the second time.

FIG. 9 is a vertical sectional view of the right hand portion of the apparatus illustrated partially in FIGS. 1 and 2.

FIG. 10 is a vertical sectional view of the final portion of the apparatus to the right of that illustrated in FIG. 9.

FIG. 11 is a partial plan view of a portion of the conveyor employed for carrying the patties through the apparatus.

FIG. 12 is a bottom view of the portion of the conveyor illustrated in FIG. 11.

FIG. 13 is a vertical sectional view of the modified form of the patty forming apparatus in accordance with the invention illustrating another form of patty turning device.

FIG. 14 is a top view of the patty forming apparatus of FIG. 13.

FIG. 15 is a perspective view of the patty turning apparatus of FIGS. 13 and 14.

FIG. 16 is a side elevational view of the conveyor and the drive mechanism for the conveyor.

FIG. 17 is an enlarged view of the conveyor drive as seen from the same side illustrated in FIG. 16.

FIG. 18 is a side elevational view of the opposite side of the conveyor from that illustrated in FIG. 17.

DESCRIPTION OF THE PREFERRED EMBODIMENTS

Figure 19:
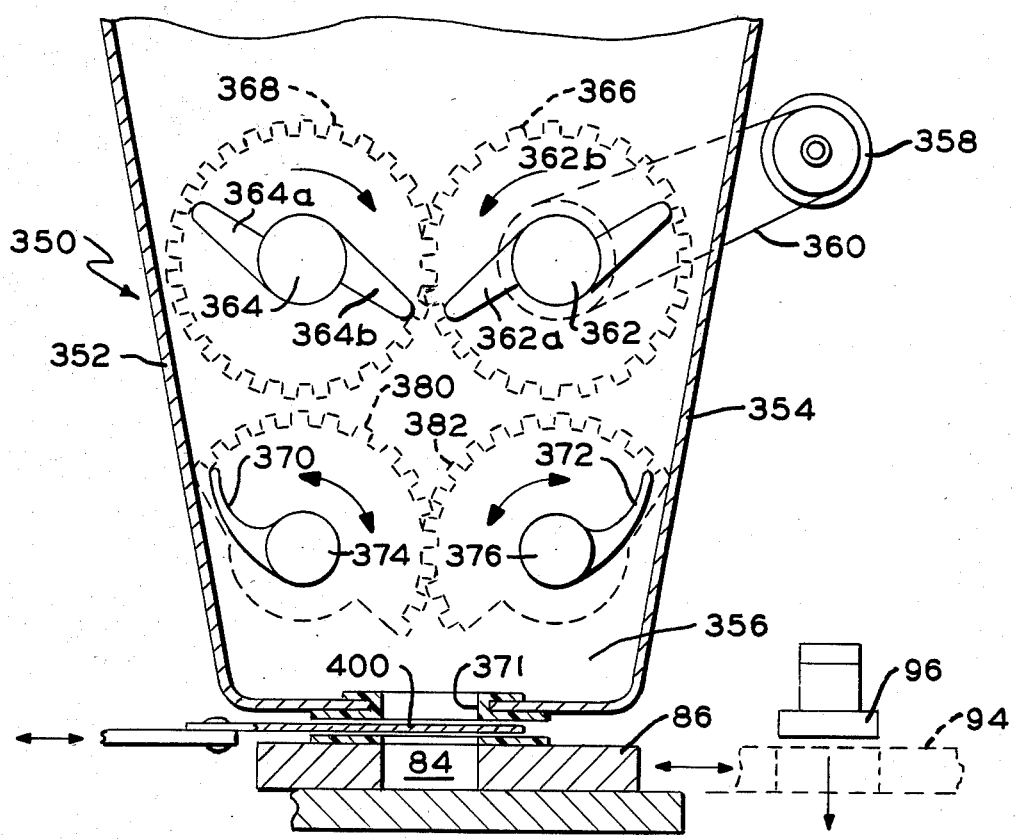
FIG. 19 is a semi-diagramatic vertical sectional view of another form of patty preform molding machine.

Refer first to FIGS. 1 and 2 which illustrate a patty forming apparatus indicated generally by the numeral 10. The apparatus includes a hopper 12 having front, rear and side walls 14, 16, 18 and 19, the one closest to the observer being removed so that the inside can be seen in FIG. 1. At the bottom of the hopper 12 is an endless belt type feed conveyor 20 including a belt 22 entrained over a pair of horizontally disposed parallel longitudinally spaced apart rolls 24 and 26 driven during operation by an electric motor 28. The upper run of the belt 22 is supported by a conveyor supporting table 30 and rests on a plurality of cross members 32. Within the hopper above the conveyor 20 is a supply of ground meat 34 which is transferred during operation by the conveyor 20 in the direction of vertically disposed parallel laterally spaced apart feed augers 36, 38 and 40, each driven during operation by means of a motor such as an electric motor M mounted above each auger and operatively connected to it through a speed reducing transmission T. The augers may be operated singly or simultaneously as desired to provide a downward flow of meat to a supply or pump chamber 42. The pump chamber 42 comprises an elongated horizontally disposed cylinder of any suitable cross-sectional configuration as, for example, rectangular within which is mounted for sliding motion a pump plunger 44 that is adapted during operation to force the ground meat within the pump chamber 42 toward the right through the pump into a feed duct 46. The plunger or piston 44 is powered by means of a hydraulic cylinder 48 to which hydraulic fluid is supplied from a reservoir 50 through pipe 52 by means of a hydraulic pump 54 connected to a power source such as an electric motor 56. Hydraulic fluid from the pump 54 exits through line 57 into a control valve 58 that diverts the fluid to either the left or right end of the cylinder 48 through adjustable pressure control or regulating valves 60 or 62, the valve 60 being used to establish a predetermined pressure with the cylinder 48 to provide a pressure of from 70 to 80 psi in each mold chamber. From the pressure control valves 60, 62, the fluid enters the cylinder through lines 64 and 66 respectively. Excess fluid is returned to the reservoir via lines 67 and 68. The operation of the valve 58 is controlled by means of controller T that is also coupled to valves 70 and 72 which are in turn connected to cylinders 74 and 76 the function of which will be described below. While only one plunger 44 has been shown in the figure, additional plungers and operating cylinders may be used if desired. These plungers can be lined up in parallel side-by-side relationship.

During operation, the conveyor 20 advances the ground meat 34 at a relatively slow rate toward the augers 36–40. The piston 44 is periodically withdrawn to the fully retracted position of FIG. 1 and then advanced toward the right again through the supply or pump chamber 42 thereby driving the ground meat from the supply chamber toward the right through the injection duct and into mold civities to be described below. The controller T causes the valve 58 to advance the piston in increments, for example by moving it forwardly toward the right in steps of about two or three inches at a time. After each step, the plunger 44 stops momentarily while the patty is removed, as will be described below. At the end of each incremental advance of the plunger 44, the pressure within the meat in the mold chamber to be described is controlled by the pressure limiting valve 60. By raising the pressure established by valve 60, the meat in the mold cavity can be made more dense and correspondingly by reducing the pressure at valve 60, the density of the meat can be reduced. The controller T receives pressure information through line 63 and plunger position information from limit switches SW via conductor 65. After the plunger 44 is moved toward the right enough to activate the right switch SW, the controller T is set to withdraw the plunger all the way to the left (the starting position of FIG. 1) at which time one or more of the augers is operated by its motor M to force more of the ground meat down into the pump chamber 42 for the next stroke of the plunger 44 toward the right to begin a new cycle. While one form of ground meat storage advancing and pumping mechanism has been described briefly by way of example, other forms of meat pumps can be used as described for example in U.S. Pat. Nos. 4,182,003, 4,054,967 or 4,137,604 as well as 3,488,798. Another form of meat pump will be described below in connection with FIGS. 19 and 20.

As shown in FIG. 1, the injection duct 46 communicates through a slot 80 in a fill plate 82 (FIG. 3) with a plurality of laterally spaced apart mold cavities 84 in a mold plate 86. The mold plate 86 is mounted for horizontal sliding motion between the fill plate 82 and an upper guide plate 90. The guide plate 90 is provided with air exhaust openings 92 which allow air to escape as the meat is rammed into the mold cavities 84. The sliding mold plate is coupled by means of a connecting rod 93 to the mold plate actuating cylinder 74. When the connecting rod 93 is extended toward the right, the mold plate is forced toward the right to the dotted line position 94 of FIG. 1 and when thus extended a knock-out cup actuating cylinder 76 is operated causing a plurality of knockout cups 96 which are themselves supported on a frame member 97, one such cup aligned with each mold cavity, to be lowered through the mold cavity 84 in the plate 86 thereby forcing the ground meat downwardly through the mold cavity 84 onto a horizontally disposed endless flexible conveyor 95 having an endless wire conveyor belt 100.

After the preforms 98 have been deposited on the upper run of the conveyor belt 100, cylinder 76 retracts the knockout cups 96 to the solid line position of FIG. 1. The mold plate 86 is then retracted from the dotted line position 94 of FIG. 1 to the solid line position and is again ready to receive another charge of meat at which time the piston 44 is then advanced a further increment toward the right thereby driving more meat through the injection duct 46 into the mold cavity 84 to begin another cycle of operation. To advance the fresh preforms, the endless conveyor 100 is driven continuously toward the right by means of a motor connected to a drive gear 104. The conveyor 100 is supported upon longitudinally spaced apart laterally extending stationary guides 106 and 108 which can be formed from suitable material such as a slippery plastic, e.g. polyethylene or nylon. The center portion of the conveyor 100 is supported by a plurality of horizontally extending support rods 110 upon which are mounted slide bars 110a.

The mold plate 86 cavities 84 will now be described in more detail with reference to FIG. 3. As shown in FIG. 3, the cavity 84 used to form the preform 98 has a side wall 85 which is straight in a vertical direction at any point around the periphery of the cavity 84. However, the outline of the cavity 84 which can be best seen in FIG. 3 and by referring to FIG. 4 which illustrates a knockout cup that has the same shape, the outline of the mold cavity is irregular and includes a plurality of peripherally distributed outwardly extending oblate recesses 84b. These recesses correspond exactly to projections 96b in each knockout cup 96. These recesses 84b are smoothly curved outwardly arched arcs. While the recesses 84b can be uniformly and symmetrically arranged around the periphery of the cavity, they are preferably randomly arranged as shown in the figures. These recesses are separated by indentations 84c and 96c which may be of a very small size or, if desired, may correspond to the arc of a circle of a relatively large size as shown at 99 in FIG. 4. The precise shape of the recesses is not critical but they preferably extend between about 1/10 and ⅛ of the diameter of the cavity 84. Thus, in the case illustrated, the height of the recesses 84b is about 1/6 the diameter of the mold cavity 84. As shown in the figures, each mold cavity 84 extends entirely through the mold plate 84. The top and bottom of each mold cavity consists of the guide plate 90 and the fill plate 82 respectively which act as sealing elements for the mold cavity to close off the mold during the filling operation as meat enters through the fill slot 80. In this way, each preform 98 has a smooth vertical side wall 98w and a flat top 98a and bottom 98b, only the top one being shown in FIG. 6. The smooth flat top and bottom surfaces are formed by the inwardly facing corresponding surfaces of the guide plate 90 and the fill plate 86 respectively. The flat top, bottom and side surfaces of the preform 98 can be clearly seen in FIG. 5. The preform 98 is thus provided with a plurality of radially projecting peripherally distributed lobes or projections 98c corresponding to the recesses 84b in the mold cavities 84. The recesses 84b are preferably irregularly or randomly distributed around the periphery of the mold cavity. The preform is also characterized by having a sharp edge at 98d and 98e where the top and side walls intersect.

Once the preforms 98 are molded, they must be pressed by forcing upper and lower surfaces toward one another to flatten them. This is accomplished by a pressing means 113 including a pair of vertically spaced apart parallel horizontally disposed pressing rolls 114 and 116 driven by a motor 282 to run at the same speed as the preforms 98 enter between them. The rolls 114 and 116 can be provided with stripping members such as a plurality of closely spaced rubber O rings 120 entrained over them and over parallel upper and lower idler rolls 122 and 124. A stationary cleaning knife 121 is positioned beneath and in engagement with the upper set of O rings 120 to scrape off and remove any meat which remains clinging to them. The spacing between the rolls 114 and 116 is less than the height of the preforms 98. For example, if the preforms 98 are initially 1" in thickness, the rolls 114, 116 may be spaced apart by about ¾" thereby flattening each preform to a thickness of about ¾" and causing it to spread in all directions radially as shown in FIG. 7 which illustrates the appearance of the preform immediately after passing between the pressing rolls 114 and 116.

After passing off of the end of the lower set of O rings 120, the partially formed patties are advanced onto a conveyor indicated generally by the numeral 126. The conveyor 126 functions as a turning conveyor and consists in this case of four pairs of cooperating endless belt conveyors 128, 130, 132 and 134, each of which is positioned to receive one of the preforms at its center. Each of the conveyors 128-134 consists of two parallel laterally spaced horizontally aligned conveyor segments that travel at slightly different speeds. The result of this action is that each preform resting thereon is caused to turn or rotate slowly about its vertical axis. The amount of turning is exactly controlled so that each patty has made approximately a 90° turn by the time it leaves the outlet end of the conveyor 126. Each of the conveyor portions 128-134 is made up of two segments A and B; the segments A are driven by four laterally spaced apart sprockets 136 mounted on a shaft 138 which is in turn driven through a suitable gear box and speed reducer 140 by a motor 142. A similar set of sprockets 144 mounted on a shaft 146 drive the adjacent conveyor segments B at a speed determined by a variable speed transmission 148 operating through gear box 150 and powered by a suitable drive means such as an electric motor 152. The speeds of the sprockets are controlled by handles 154 and 156, the first of which is coupled by means of a connecting cable 158 to the variable speed transmission 140. The control levers 154 and 156 are both mounted on the same side of the apparatus so that the speeds of the conveyor segments A and B can be simultaneously adjusted to make sure that the preforms 98 have made almost precisely a 90° turn by the time they reach the outlet or right end of the conveyor 126. As can be seen by a comparison of FIGS. 9 and 12, the lower run of conveyor segments A is guided by a pair of parallel spaced apart guide rolls 160 and 162 with a provision for a downwardly directed portion 164 which passes below and is engaged around each of the sprockets 136. Similarly, the lower portion 166 of each of the conveyor sections B is guided by the parallel spaced apart laterally extending guide rolls 168 and 170 and a portion is in contact with one of the sprockets 144 as shown at 172. To run the conveyor sections A and B at the proper speed, the operator stands by the control levers 154, 156 and adjusts one or both of them so that each of the patties which are positioned to overlap the conveyor sections running at different speeds makes a 90° turn on a vertical axis extending through its own center just at the point where it reaches the right end of the conveyor. The conveyor segments A and B as well as the drive shafts 138 and 146 are supported between a pair of laterally spaced apart parallel longitudinally extending frame members 147 and 149. Also mounted between these frame members 147 and 149 are parallel laterally extending conveyor guide elements 151a, 151b and 151c. Transversely extending conveyor supports 153 are provided below the top run of the conveyor 126.

A portion of a suitable wire belt conveyor element is shown in FIG. 11. The wire belt consists of a series of transversely extending stainless steel wires 174 which are wrapped with flattened coils of stainless steel wire 176 extending between adjacent pairs. Other suitable conveyor materials will be apparent to those skilled in the art.

From the conveyor 126 each of the patties 98 which has now been reoriented by making a 90° turn passes through a second pressing means 180 comprising a pair of vertically spaced apart horizontally extending parallel rolls 182 and 184 that are mounted on axles 186 and 188 respectively. The spacing between the rolls 182, 184 is somewhat less than the spacing between the rolls 114, 116 to thereby further flatten the patties and spread the edge portions radially in all directions. The shape of the patty following the second spreading operation is shown in FIG. 8. The finished patty 190 has extended upper and lower surfaces 192, 193. The peripheral side edge 196 of the patty is composed of a series of oblate outwardly arched segments 198 defining projections of irregular shape and distribution. Centrally extending fracture lines 200 are present between the oblate projections. At least some of the fracture lines or cracks extend from the upper to the lower surface of the patty. If cooked in certain ways, it is possible for the projection and fracture lines between them to help provide more natural flavor variations and to help the patty to fall apart easily when chewed. Thus, some parts of the patty can be cooked if desired to a more well done condition while other parts may be relatively rare thereby providing a more interesting and appetizing flavor more like that of a good cut of beef steak. Besides helping the patty to fall apart easily, it was discovered that some of the fracture lines and interstices between the meat particles also tend to absorb and retain cookout fat and moisture for flavor enhancement. This juice or fat would otherwise be lost and simply remain on the grill. The initial compression of the patty in the mold chamber and the two subsequent pressing steps provide sufficient cohesion between the meat particles so that the patties resist falling apart during the cooking operation in a frying pan or on a grill. The state of compression is preferably controlled by providing not over 80 psi in the mold chamber so that the patty does not become dense or rubbery. When cooked, the patty will have a loose chewing texture little resiliency so that it tends to fall apart easily when chewed. The patty is free from smooth molded surfaces produced by shaping or forming or by molding dies and the like. This adds to its visual appeal, again tending to make it more appetizing and more natural looking. Because the consistency of each patty is never the same throughout and the angle that it enters the rolls varies somewhat and perhaps other factors, it was found that each of the finished patties 190 has an irregular shape and a shape different from the others. That is to say, the shape of each finished patty 190 is unique. This helps also to make the patties more visually appealing and more appetizing.

The pressing means 180 is preferably provided with guides which consist of a multiplicity of rubber O rings distributed in parallel side-by-side relationship along the length of the rolls and entrained over idler rolls 204, 206. At least one and preferably both of the pressing rolls 182, 184 is driven in given directions to feed the patties from left to right in the figures. Assuming that the intermediate preform 98 has a thickness of about ⅜", then the rolls 182, 184 can be spaced apart at a distance of about 7/16". While the dimensions are not critical, the two pairs of pressing rolls should be set at successively smaller clearances to thereby reduce the height of the patties progressively in two stages. In this way, the height is reduced only partially in the first stage and to the full amount desired in the second stage.

After emerging from the second pressing means 180, the patties 190 pass onto a conveyor 210 comprising an endless conveyor element 212 entrained over a power operated drive sprocket 214 and a pair of parallel longitudinally spaced apart horizontally disposed guides 126 and 218 which can be formed from a suitable material such as a plastic resin having a low coefficient of friction and a centrally disposed support means 220. From the conveyor 210 the finished patties 192 enter the freezing tunnel 194 of any suitable type such as the kind filled with vapor evolved from liquid nitrogen where they are flash frozen. The finished patties are then packaged for shipment in a frozen condition.

Refer now to FIGS. 13, 14 and 15 which illustrate a modified form of a turning device. In this case, the patties 98 pass onto a conveyor 224 composed of an endless conveyor element 226 having a lower run 228 which is entrained over a drive sprocket 230 supported on a shaft 231 connected to a motor (not shown). The upper run is entrained over laterally extending horizontal guides such as 232, 234 and 236 all supported on longitudinally extending horizontally disposed frame members 238 and 240. To the frame members is connected a horizontally disposed laterally extending mounting bracket 242 secured in position, for example, by means of bolts 244 and 246 and having a plurality of parallel laterally spaced apart slightly inclined fingers 248 mounted thereon and extending downwardly toward the upper run of the conveyor 126 but terminating a fraction of an inch above the conveyor. Each of the fingers 248 is positioned slightly to one side of the center line of the path of travel 250 of the patties 98. Consequently, the patties approach the fingers so that the front edges thereof then engage the fingers at a point spaced slightly to one side from their center lines 250 on the axis of travel. The forward motion of the conveyor cooperating with the pressure exerted by each finger on the front edge of each patty causes it to turn or pivot about its own central vertical axis as it passes the finger. The amount of rotation accomplished is approximately 90°.

In this way, the patties, after passing through either the turning conveyor 126 or turning conveyor 224, will be ready to be rolled in the second stage at an angle of 90° from the direction in which they were rolled during passage between the first pressing rolls 114, 116. It will thus be seen that the patties shown at 98a in FIGS. 14 and 15 have been turned in a clockwise direction as seen from above approximately 90° from the original position at the left of each of the figures just prior to engagement with the turning fingers 248. It was found that if the fingers 248 are held at an inclined angle with their lower ends pointing in the machine direction as shown, there is less opportunity for them to accidentally damage the conveyor 226 while at the same time providing a better job of turning the patties.

In FIG. 14 the lateral spacing which may, for example, be about ⅛" is clearly shown between the rubber O rings 120 entrained over rolls 114 and 122. It can also be seen that the rolls 114 and 122 are mounted for rotation between a pair of frame members 260 and 262. Above the frame members 260-262 is a cover 264 provided with an emergency stop switch 266. The transfer conveyor 100 as shown in FIG. 14 is supported upon laterally spaced transversely extending frame members 268 and 270 which also support the shaft of sprocket 104. It can also be seen that the transversely extending conveyor support rods 110 have mounted thereon a plurality of longitudinally extending laterally spaced apart slippery plastic slide bars 110a.

The layout of the first and second pressing roll sets and the intermediate conveyor can be best seen in FIGS. 16, 17 and 18. As shown in the figure, the patty forming assembly is indicated by the numeral 10 at the right in the figure. Adjacent to the patty forming means is the takeway conveyor 100 with the left hand frame member 268 being visible. The first pressing assembly is indicated generally by numeral 113. The pressing assembly 113 includes vertically disposed laterally spaced apart and parallel side plates 276 and 278 which are both connected together rigidly at their lower ends and are mounted by means of a pin 279 to a supporting framework 280. An electric motor 282 is connected through a suitable transmission 284 to a sprocket and chain 286 which drives sprocket 288 supported with a gear 289 (FIG. 14) on a shaft 290. Gear 289 is coupled to spur gears 292 and 294, the latter of which drives gear 296 and its support shaft 298 which is connected to the sprocket 104 and its support shaft 102 to drive the conveyor 100. The drive for the upper pressing roll 114 is provided by the opposite end of the shaft 300 supporting gear 294. The opposite end of shaft 300 projects from the outer side of the conveyor 224 as seen in FIG. 18. The drive for the conveyor 224 is accomplished through idler gears 302, 304 which are coupled to a gear 306 supported on a shaft 231 to which the drive sprocket 230 of the conveyor 126 or 224 is mounted as the case may be.

Each pressing roll set is provided with a safety switch 310. On the other end of the roll set is provided a handle 312 extending between the frame members 260 and 262. The frame members 260, 262 supporting the upper pressure roll 114 are pivotally mounted upon the shaft 300 at their lower ends.

As shown in FIG. 18, the vertical height of the upper roll 114 and hence the spacing between it and the lower roll 116 is controlled by a screw 320 pivotally connected to frame member 260 by means of a pivot 322 and being threaded through pin 324 which is supported on the supporting framework. A handle 326 is used for raising and lowering the roll 114 and establishing the proper spacing between it and the roll 116.

The shaft 300 is provided with a spur gear 328 connected through an idler gear 330 to a drive gear 332 mounted on the shaft 115 of the roll 114. A stop assembly 334 is provided to engage a support 336 connected to the framework 268 to limit the minimum distance between the rolls 114 and 116. The gears and sprockets shown in FIG. 17 are enclosed within a cover 277 which has been removed in FIG. 17 so that the operating parts can be seen. The second pressing means 180 illustrated in FIG. 16 is identical with the pressing assembly 113 and all the same numerals refer to corresponding parts. From the second pressing assembly 180 the product is conveyed by means of a final conveyor 210 to the freezer 194 described above.

Figure 20:
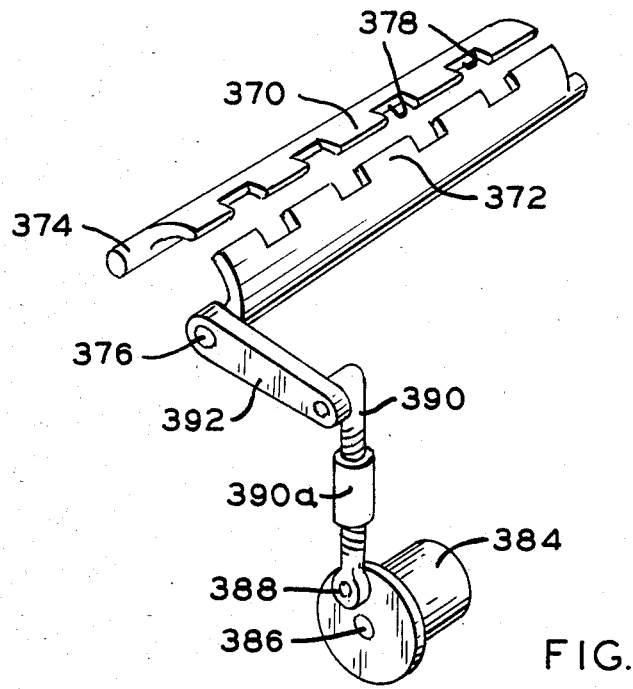
FIG. 20 is a diagramatic perspective view illustrating the mechanism used for filling the die of the apparatus illustrated in FIG. 19.

Refer now to FIGS. 19 and 20 which illustrate an alternative form of molding machine for the preformed patties 98. As shown in the figures, there is provided a hopper 350 having side and end walls 352, 354, 356, only three of which are shown in FIG. 19, the one closest to the observer being removed so that the inside structure can be seen. Within the hopper is stored a quantity of ground meat that is to be pressed into patties. An external motor 358 is connected via a chain and sprocket assembly 360 to drive a pair of hopper feed blades or paddles 362 and 364 which are coupled together by means of spur gears 366 and 368 respectively and driven in given feed directions so that the centermost blade moves in a downward direction. Each of the hoppper feed blades includes a pair of radially extending blade members 362a, 362b; 364a and 364b. These blades churn the ground meat and also force it downwardly toward an outlet 371 at the bottom of the hopper 350. Mounted within the hopper below the hopper feed blades 362, 364 are a pair of transversely extending parallel horizontally disposed compression bars 370 and 372 that are adapted to swing about pivots 374, 376 respectively. The free edges of the compression bars are provided with serrations 378. The pivots 374, 376 are connected together by means of gear sectors 380, 382. Oscillating motion is imparted to the compression bars 370, 372 by means of an electric motor 384 (FIG. 20) having a shaft 386 provided with an eccentric 388 connected by means of an extendable link 390 to a rocker arm 392 that is coupled rigidly to the pivot 376. If the arm 390 is extended by turning a threaded turnbuckle 390a, the lowermost position of the compression bars will be lowered. If shortened, the lowermost position of the compression bars will be elevated. Beneath the hopper is a reciprocating horizontally disposed mold sealing plate 400 which covers the discharge opening (or outlet) 371 at times. When withdrawn by moving it toward the left in the figure, the compression bars are free to force ground meat under pressure through the outlet 371 into a mold cavity 84 within a mold plate 86 similar to that already described. One or more mold cavities or openings 84 can be provided in each plate 86. After the meat has been forced into the mold cavity 84 by the pressure bars 370, 372, the sealing plate 400 is moved to the position shown in the figure and the mold plate 86 is shifted to the right in the figure to the dotted line position 94. The knockout cups 96, one of which is shown in FIG. 19, then slide downwardly through the mold cavities 84 to strip the preform from the mold plate 86 as described before in connection with FIGS. 1 and 2. Suitable mechanism can be used such as mechanical couplings or electric timers for coordinating the action of the motors 358, 384 and the closure plate 400 as well as the sliding action of the mold plate 86 and the downward movement of the knockout cup 96. The pressure within the mold cavity 84 can be increased by lowering the lowermost position of the compression bars 370, 372. Pressure can also be increased by timing the hopper feed blade motion so that the blades pass closer to the tips of the compression bars 370, 372. This is because they will just be in the process of transferring a large volume of ground meat into the region between the compression bars if so positioned. By thus changing the lowermost position of bars 370, 372 and their angular positions relative to blades 362, 364, a means is provided for maintaining the pressure within the mold cavity 84 at about 70 to 80 psi. Thus will control the density of the preform 98 to establish the proper degree of adhesion between the meat particles making up the preform. In this way, a tender and loose bite texture is achieved in the finished product. On the other hand, if pressures exceed about 80 psi, the product becomes relatively more tough and somewhat rubbery. The pressure regulation as described eliminates these undesirable texture characteristics.

The invention provides a very appetizing looking patty with excellent visual appeal. Moreover, all the patties look different yet the weight of each is held within precisely controlled predetermined limits, usually 2% or less and often less than 1%. It was also discovered that by providing a molding pressure of 70–80 psi followed by two separate pressing stages that are separated by a short period of time during which the patties are able to relax, that the finished patty has an excellent loose or soft bite texture rather than tending to be rubbery, tough or resilient. The shape and the texture are also improved partially as the result of maintaining the product temperature and particle grind size within the preferred ranges set forth.

Many variations of the invention will be apparent to those skilled in the art once the principles of the invention are understood within the scope of the appended claims.

What is claimed is:

1. An apparatus for forming meat patties from ground meat, the formed patties having extended substantially parallel top and bottom surfaces and a peripheral side wall, said apparatus comprising a mold plate with a mold chamber therein, each such chamber having a side wall including spaced apart peripherally distributed recesses, a mold closure means to seal off the mold cavity in the mold plate, said apparatus having an injection duct extending therethrough into the mold chamber, a storage chamber for the ground meat communicating through the injection duct with the mold chamber, a pump housing including a meat pumping means for propelling the ground meat from the storage chamber through the duct into the mold chamber at a pressure of about 70 to 80 p.s.i. within the mold chamber to thereby compress the meat within the mold chamber to a predetermined density, a means establishing relative motion between the mold plate and the mold closure means to open the mold chamber in the mold plate after the chamber has been filled, means to strip the patty from the mold chamber when the mold chamber is open, pressure members engageable with the top and bottom surfaces of the stripped out patty to force the top and bottom surfaces toward one another causing the patty to spread out peripherally in all directions and causing said patty to have an irregular outline and to fracture at the edge thereby providing radially extending peripherally distributed compression fractures around the periphery of the patty extending partially toward the center thereof.

2. The apparatus of claim 1 wherein the mold chamber extends through the mold plate, said mold plate being open at the top and the bottom of each such chamber, said side wall of the chamber is defined by a straight line extending from the top of the chamber to the bottom of the chamber at all points distributed around the periphery of the chamber and the recesses are separated by indentations both of which are arcuate in shape in said recesses extend between about ⅛ and 1/10 of the smallest diameter of the chamber in an outward direction.

3. The apparatus of claim 2 wherein the recesses are irregularly distributed around the periphery of the mold chamber.

4. The apparatus of claim 2 wherein the recesses and indentations comprise circular arcs connected together at their ends and the recesses are distributed irregularly around the periphery of the chamber.

5. The apparatus of claim 3 wherein the means for stripping the patties from the chambers comprises knock-out cups having the same shape as the chambers and adapted to slide therethrough from the upper edge of the chamber to the lower edge thereof and thereby stripping the patties from the chambers.

6. The apparatus of claim 1 wherein the pressure members comprise at least one pair of cooperating driven rolls adapted to receive the patties stripped from the mold cavity and spaced apart by a distance which is less than the height of the mold chambers and the patties formed therein, the patties being adapted to be fed between the pair of rolls and the pressure exerted by the driven rolls forcing the top and bottom surfaces of the patties toward one another.

7. The apparatus of claim 6 wherein rotatable O-ring supports are mounted adjacent to each of the rolls and a plurality of parallel longitudinally extending side-by-side O-rings are entrained over the supports and a corresponding roll of said pair of rolls to help prevent meat from adhering to the surface of said rolls.

8. The apparatus of claim 1 wherein first and second pressure members are provided having progressively reduced spacing therebetween and a conveyor means is provided for transferring the patties from the first pressure means to the second pressure means whereby patties are sequentially pressed to reduce the thickness thereof in two successive stages.

9. The apparatus according to claim 8 wherein a means is provided for turning the patties about a vertical axis extending through the center thereof normal to the top and bottom surfaces between said first and second pressure members.

10. The apparatus of claim 9 wherein the turning means comprises a stationary finger positioned to engage the patty travelling on said conveyor at a location positioned laterally from center of the path of travel of the patty to thereby cause the patty to rotate about a vertical axis through an angle of about 90° as the conveyor carries it past the stationary finger.

11. The apparatus of claim 10 wherein the finger is positioned at an inclined angle with respect to the vertical such that its lower end is pointing in the direction of the path of travel of patties, said lower end being spaced a fraction of an inch above the surface of the conveyor.

12. The apparatus of claim 8 wherein a means is provided for turning the patties 90° about a vertical axis between said first and second pressing means and said turning means comprises a pair of parallel horizontal conveyor sections positioned in side by side relationship travelling at different speeds whereby a patty positioned to overlap both of said conveyor sections will be turned about a vertical axis normal to an upper surface of said conveyor sections.

13. The apparatus of claim 8 wherein said first and second pressure members comprise first and second cooperating vertically spaced apart roll pairs driven in a selected feed direction and a transfer conveyor located there between to transfer the patties from one roll pair to a second roll pair, each such roll pair being set to compress the upper and lower surfaces of the patty toward one another progressively thereby reducing the thickness of the patty in two stages and spread the peripheral edges thereof radially while producing radially distributed pressure fractures in the edge of the patty.

14. The apparatus of claim 13 wherein each pair of rolls includes an O-ring supporting roll adjacent thereto, a plurality of longitudinally extending parallel side-by-side O-rings are entrained between each such O-ring support roll and a corresponding adjacent pressure roll to help prevent meat from adhering to the surface thereof and to guide the forward motion of the patties.

15. The apparatus of claim 14 wherein the transfer conveyor includes a means for turning each of the patties about a vertical axis extending through its center through an angle of 90° whereby the second roll pair presses the patty at about right angles to the direction of passage through the first roll pair.

16. The apparatus of claim 13 wherein said transfer conveyor comprises a supporting framework, an even number of a plurality of side-by-side longitudinally extending spaced apart parallel belts having an upper run position in a substantially horizontal plane, the belts being arranged in side-by-side pairs of belts, each pair including a first and second belt, a first drive means for driving the first belt at the first speed, the second drive means driving the second belt at the second speed and a means for selectively and independently controlling the speeds of the first and second drive means, the first drive means running the first belt at a faster speed than the second belt whereby the patties will rotate about a vertical axis as they travel from one end of the transfer conveyor to the other.

17. A process for producing ground meat patties having extended substantially parallel top and bottom surfaces and an irregular peripheral edge,
said process comprising providing ground meat that has been subdivided to a selected particle size,
placing the ground meat in a supply chamber,
providing a mold cavity,
closing the mold cavity,
transferring the ground meat from the supply chamber to the mold cavity,
establishing a pressure of about 70 to 80 psi in the meat within the mold chamber,
opening the mold chamber and stripping the preformed patty thus produced from the mold chamber,
pressing the upper and lower surfaces of the preformed patty toward one another to flatten the patty so as to reduce its thickness and spread its edges radially in all directions thereby forming irregular compression fractures distributed around the edge of the patty and extending partially from the edge toward the center of the patty.

18. The process of claim 17 wherein two of said pressing steps are employed with the first pressing step pressing the patties to a predetermined thickness and second pressing step pressing said patties to further reduce their thickness and a rest period is provided between said two pressing steps.

19. The process of claim 17 wherein the patties are turned about a vertical axis extending through their own centers while being transferred from the first pressing step to the second pressing step whereby the patties enter the second pressing step at an angle of 90° from the direction in which they entered the first pressing step.

20. The process of claim 17 wherein the meat is ground to a particle grind size of about 3/32" to about 5/32" and is held at a temperature between about 32° F. and 34° F. at the time it is formed in the mold cavity.

21. The process of claim 17 wherein the pressure applied to the meat injected into the mold cavity determines the density thereof and the resulting weight of the patty formed in each section mold cavity to an accuracy within about 2% of the desired target weight and the subsequent pressing of the patty removed from the mold cavity provides it with an irregular and unique peripheral contour whereby each patty has a different shape and a weight that is within precisely predetermined limits.

22. The process of claim 17 wherein the patty is passed through two pairs of cooperating driven rolls including the first and second pair with the first pair set at a clearance that is less than the thickness of the preformed patty and the second at a clearance that is less than the clearance of the first pair of rolls to thereby reduce the thickness of the patties by rolling them to reduced thickness in two successive stages and the patties are allowed to relax therebetween.

23. An apparatus for forming patties from chilled meat ground to a selected particle size range, the formed patties having extended substantially parallel top and bottom surfaces and a pheripheral edge,
said apparatus comprising:
a mold with a mold cavity therein each such mold cavity having a sidewall of irregular outline,
means to close the mold cavity,
a storage chamber for the ground meat communicating with the mold cavity,
means for propelling the ground meat from the storage chamber into the mold cavity at elevated pressure, said pressure being controlled to lie within a predetermined range which is high enough to hold each of the patties together throughout subsequent processing and compressing the meat within the mold cavity to a predetermined density,
means for opening the mold cavity,
means to strip the patty from the mold cavity when the mold cavity is open,
pressure members engageable with the top and bottom surfaces of the stripped out patty, comprising at least one pair of spaced-apart pressure rolls to engage the patty after removal from the mold cavity and to force the top and bottom surfaces toward one another causing the patty to spread out peripherally in all directions and to have an irregular or outline and to fracture at the edge thereby providing radially extending, peripherally distributed compression fractions around the peripheral edge of the patty extending partially toward the center thereof.

24. The apparatus of claim 23, wherein:
one additional pair of rolls is provided downstream of said one pair to thereby provide two cooperating successive pairs of spaced rolls to compress each patty progressively in two successive stages.

25. The apparatus of claim 24, therein:
means is provided for turning the patties about a vertical axis normal to the top and bottom surfaces between said two pairs of pressure rolls to allow the second said pair of rolls to compress the patties in a direction different from the first said pair.

* * * * *

UNITED STATES PATENT AND TRADEMARK OFFICE
CERTIFICATE OF CORRECTION

PATENT NO. : 4,516,291

DATED : May 14, 1985

INVENTOR(S) : Robert D. Goldberger et al.

It is certified that error appears in the above-identified patent and that said Letters Patent is hereby corrected as shown below:

```
Column 13, line 46, "cavity" should read -- chamber --.
Column 13, line 49, delete the paragraphing of the
phrase beginning "the patties".
Column 15, line 24, after "step", "pressing" should
read -- compressing --; line 26, "step" should read
-- compressing --.
Column 16, line 34, cancel "or"; line 41, "one" should
read -- an --; line 45, "therein" should read -- wherein --.
Column 15, lines 12, 13 and 14, "chamber" in each
occurrence should read -- cavity --.
```

Signed and Sealed this

Twenty-fourth Day of December 1985

[SEAL]

Attest:

DONALD J. QUIGG

Attesting Officer

Commissioner of Patents and Trademarks